United States Patent
Eto et al.

(10) Patent No.: US 11,841,696 B2
(45) Date of Patent: Dec. 12, 2023

(54) TOOL SELECTION DEVICE, METHOD, AND PROGRAM, AND NC PROGRAM CREATION SYSTEM

(71) Applicant: MITSUBISHI HEAVY INDUSTRIES, LTD., Tokyo (JP)

(72) Inventors: Jun Eto, Tokyo (JP); Shinichi Takeuchi, Tokyo (JP); Toshiyuki Tanaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 807 days.

(21) Appl. No.: 16/965,123

(22) PCT Filed: Mar. 19, 2019

(86) PCT No.: PCT/JP2019/011583
§ 371 (c)(1),
(2) Date: Jul. 27, 2020

(87) PCT Pub. No.: WO2019/188619
PCT Pub. Date: Oct. 3, 2019

(65) Prior Publication Data
US 2021/0041856 A1    Feb. 11, 2021

(30) Foreign Application Priority Data
Mar. 29, 2018   (JP) ................. 2018-064497

(51) Int. Cl.
*G05B 19/4155*   (2006.01)
*B23Q 3/155*   (2006.01)
*G05B 19/4093*   (2006.01)

(52) U.S. Cl.
CPC ..... *G05B 19/4155* (2013.01); *B23Q 3/15546* (2013.01); *G05B 19/40938* (2013.01);
(Continued)

(58) Field of Classification Search
CPC ...... G05B 19/4155; G05B 2219/37355; B23Q 3/15546
(Continued)

(56) References Cited

U.S. PATENT DOCUMENTS

| | | | | |
|---|---|---|---|---|
| 4,945,487 A | * | 7/1990 | Kimura | G05B 19/41 407/62 |
| 5,444,636 A | * | 8/1995 | Yoshida | G05B 19/416 700/189 |

(Continued)

FOREIGN PATENT DOCUMENTS

| | | | |
|---|---|---|---|
| CN | 104216335 A | * | 12/2014 |
| CN | 104216335 A | | 12/2014 |

(Continued)

OTHER PUBLICATIONS

Applied Science: "Milling machine tutorial—cutter selection, speeds and feeds, coolant, high speed machining", Jun. 25, 2013, YouTube, Retrieved from the Internet: URL: https://www.youtube.com/watch?v=ip2jm_6aUy.

(Continued)

*Primary Examiner* — Ronald D Hartman, Jr.
(74) *Attorney, Agent, or Firm* — KANESAKA BERNER AND PARTNERS LLP

(57) ABSTRACT

A tool selection unit has an analysis unit and a selection unit. The analysis unit determines a pick feed direction and the feed direction of a tool on the basis of information relating to the shape of a machining region including a double curved surface or a machining surface in the machining region, and creates parameter information in which at least a value relating to the smallest curvature radius in the machining surface and a value relating to the largest curvature radius in the pick feed direction are recorded. The selection unit selects a tool to use for machining the machining region on the basis of the parameter information, from among a (Continued)

plurality of tools having a bottom cutting edge and a side cutting edge formed in a curved-surface shape having a curvature radius different from a curvature radius of a curved surface of the bottom cutting edge.

8 Claims, 15 Drawing Sheets

(52) U.S. Cl.
CPC .............. *G05B 2219/35167* (2013.01); *G05B 2219/35185* (2013.01); *G05B 2219/37355* (2013.01)

(58) Field of Classification Search
USPC ........................................................ 700/187
See application file for complete search history.

(56) References Cited

U.S. PATENT DOCUMENTS

| | | | | |
|---|---|---|---|---|
| 5,815,400 | A * | 9/1998 | Hirai | G05B 19/401 700/184 |
| 6,591,158 | B1 * | 7/2003 | Bieterman | G05B 19/41 700/169 |
| 2002/0002420 | A1 * | 1/2002 | Hirai | G05B 19/4099 700/189 |
| 2002/0071732 | A1 * | 6/2002 | Funaki | B23C 3/26 409/80 |
| 2004/0204786 | A1 * | 10/2004 | Nakamura | G05B 19/4097 700/182 |
| 2005/0246052 | A1 * | 11/2005 | Coleman | G05B 19/40937 700/190 |
| 2016/0291570 | A1 * | 10/2016 | Iriguchi | G05B 19/4103 |
| 2019/0235474 | A1 | 8/2019 | Eto et al. | |
| 2020/0122336 | A1 * | 4/2020 | Matsuo | B25J 13/085 |
| 2021/0041856 | A1 * | 2/2021 | Eto | B23Q 3/15546 |

FOREIGN PATENT DOCUMENTS

| | | | | |
|---|---|---|---|---|
| JP | 09201713 | A | * | 8/1997 |
| JP | H09201713 | A | | 8/1997 |
| JP | 09292906 | A | * | 11/1997 |
| JP | H09292906 | A | | 11/1997 |
| JP | 2006263904 | A | * | 10/2006 |
| JP | 2006263904 | A | | 10/2006 |
| JP | 2013088976 | A | * | 5/2013 |
| JP | 2013088976 | A | | 5/2013 |
| JP | 5402192 | B | | 1/2014 |
| JP | 2015074078 | A | * | 4/2015 |
| JP | 2015074078 | A | | 4/2015 |
| JP | 5890907 | B | | 3/2016 |
| JP | 2018008323 | A | * | 1/2018 |
| JP | 2018008323 | A | | 1/2018 |
| JP | 2018032157 | A | | 3/2018 |

OTHER PUBLICATIONS

Extended European Search Report of European Application No. 19776604.1 dated Apr. 6, 2021; 9pp.
International Search Report and Written Opinion of International Application No. PCT/JP2019/011583 dated Jun. 18, 2019; 16pp.

* cited by examiner

FIG. 7

| COMPONENT ID | MACHINING REGION ID | Eg | Fl_r | On_r | MinCt_r | MaxCt_r | Fl_h | S |
|---|---|---|---|---|---|---|---|---|
| 0001 | 1 | BOTTOM CUTTING EDGE | A | *** | *** | *** | *** | *** |
| | 2 | BOTTOM CUTTING EDGE | A | *** | *** | *** | *** | *** |
| | 3 | BOTTOM CUTTING EDGE | A | *** | *** | *** | *** | *** |
| | ... | BOTTOM CUTTING EDGE | ... | ... | ... | ... | ... | ... |
| | k | BOTTOM CUTTING EDGE | B | *** | *** | *** | *** | *** |
| 0002 | k+1 | BOTTOM CUTTING EDGE | B | *** | *** | *** | *** | *** |
| | k+2 | BOTTOM CUTTING EDGE | A | *** | *** | *** | *** | *** |
| | k+3 | BOTTOM CUTTING EDGE | A | *** | *** | *** | *** | *** |
| | ... | BOTTOM CUTTING EDGE | ... | ... | ... | ... | ... | ... |
| | m | BOTTOM CUTTING EDGE | B | *** | *** | *** | *** | *** |
| 0003 | m+1 | BOTTOM CUTTING EDGE | B | *** | *** | *** | *** | *** |
| | m+2 | BOTTOM CUTTING EDGE | B | *** | *** | *** | *** | *** |
| | ... | BOTTOM CUTTING EDGE | ... | ... | ... | ... | ... | ... |
| | n | BOTTOM CUTTING EDGE | C | *** | *** | *** | *** | *** |

FIG. 9

| TOOL ID | TYPE | Ns_R | Ls_R | Ns_H | Ls_D | Cu_D | MinCr |
|---|---|---|---|---|---|---|---|
| 1 | LENS | *** | *** | *** | *** | *** | *** |
| 2 | LENS | *** | *** | *** | *** | *** | *** |
| 3 | LENS | *** | *** | *** | *** | *** | *** |
| 4 | LENS | *** | *** | *** | *** | *** | *** |
| : | : | : | : | : | : | : | : |

FIG. 10

| GROUP | COMPONENT ID | MACHINING REGION ID | Eg | Fl_r | Cn_r | MinCt_r | MaxCt_r | Fl_h | S |
|---|---|---|---|---|---|---|---|---|---|
| G1 | 0001 | 1 | BOTTOM CUTTING EDGE | A | *** | *** | *** | *** | *** |
| G1 | 0001 | 2 | BOTTOM CUTTING EDGE | A | *** | *** | *** | *** | *** |
| G1 | 0001 | 3 | BOTTOM CUTTING EDGE | A | *** | *** | *** | *** | *** |
| G1 | 0002 | k+2 | BOTTOM CUTTING EDGE | A | *** | *** | *** | *** | *** |
| G1 | 0002 | k+3 | BOTTOM CUTTING EDGE | A | *** | *** | *** | *** | *** |
| G1 |  | : | BOTTOM CUTTING EDGE | A | : | : | : | : | : |
| G2 | 0001 | k | BOTTOM CUTTING EDGE | B | *** | *** | *** | *** | *** |
| G2 | 0002 | k+1 | BOTTOM CUTTING EDGE | B | *** | *** | *** | *** | *** |
| G2 | 0002 | m | BOTTOM CUTTING EDGE | B | *** | *** | *** | *** | *** |
| G2 | 0003 | m+1 | BOTTOM CUTTING EDGE | B | *** | *** | *** | *** | *** |
| G2 | 0003 | m+2 | BOTTOM CUTTING EDGE | B | : | : | : | : | : |
| G3 |  | : | BOTTOM CUTTING EDGE | C | : | : | : | : | : |
| G3 | 0003 | n | BOTTOM CUTTING EDGE | C | *** | *** | *** | *** | *** |

| GROUP | COMPONENT ID | MACHINING REGION ID | Eg | Fl_r | Cn_r | MinCt_r | MaxCt_r | Fl_h | S | Tool |
|---|---|---|---|---|---|---|---|---|---|---|
| G1 | 0001 | 1 | BOTTOM CUTTING EDGE | A | *** | *** | *** | *** | *** | TL1 |
| G1 | 0001 | 2 | BOTTOM CUTTING EDGE | A | *** | *** | *** | *** | *** | TL1 |
| G1 | 0001 | 3 | BOTTOM CUTTING EDGE | A | *** | *** | *** | *** | *** | TL1 |
| G1 | 0002 | k+2 | BOTTOM CUTTING EDGE | A | *** | *** | *** | *** | *** | TL1 |
| G1 | 0002 | k+3 | BOTTOM CUTTING EDGE | A | *** | *** | *** | *** | *** | TL1 |
| G1 | ⋮ | ⋮ | BOTTOM CUTTING EDGE | A | ⋮ | ⋮ | ⋮ | ⋮ | ⋮ | TL1 |
| G2 | 0001 | k | BOTTOM CUTTING EDGE | B | *** | *** | *** | *** | *** | TL2 |
| G2 | 0002 | k+1 | BOTTOM CUTTING EDGE | B | *** | *** | *** | *** | *** | TL2 |
| G2 | 0002 | m | BOTTOM CUTTING EDGE | B | *** | *** | *** | *** | *** | TL2 |
| G2 | 0003 | m+1 | BOTTOM CUTTING EDGE | B | *** | *** | *** | *** | *** | TL2 |
| G2 | 0003 | m+2 | BOTTOM CUTTING EDGE | B | *** | *** | *** | *** | *** | TL2 |
| G2 | ⋮ | ⋮ | BOTTOM CUTTING EDGE | B | ⋮ | ⋮ | ⋮ | ⋮ | ⋮ | TL2 |
| G3 | ⋮ | ⋮ | BOTTOM CUTTING EDGE | C | ⋮ | ⋮ | ⋮ | ⋮ | ⋮ | TL2 |
| G3 | 0003 | n | BOTTOM CUTTING EDGE | C | *** | *** | *** | *** | *** | TL3 |

| NUMBER OF MACHINING REGION | MACHINING REGION ID | Fl_r | Cn_r | MinCt_r | MaxCt_r | Fl_h | S | Tool | Np | ΣNp |
|---|---|---|---|---|---|---|---|---|---|---|
| 1 | 1 | A | 12 | 250 | *** | *** | *** | TL1 | Np(1) | ΣNp(G1) |
| 2 | 2 | A | 13 | 400 | *** | *** | *** | TL1 | Np(2) | |
| 3 | 3 | A | 16 | 1000 | *** | *** | *** | TL1 | Np(3) | |
| 4 | 4 | A | 20 | 1000 | *** | *** | *** | TL1 | Np(4) | |
| 5 | 5 | A | 12 | 500 | *** | *** | *** | TL1 | Np(5) | |
| ⋮ | ⋮ | ⋮ | ⋮ | ⋮ | ⋮ | ⋮ | ⋮ | ⋮ | ⋮ | |
| p | p | A | 26 | 1500 | | | | TL1 | Np(p) | |

| NUMBER OF MACHINING REGION | MACHINING REGION ID | Fl_r | Cnt_r | MinCt_r | MaxCt_r | Fl_h | S | Tool | Np | Σ Np |
|---|---|---|---|---|---|---|---|---|---|---|
| 1 | 1 | A | 12 | 250 | *** | *** | *** | TL1 | Np(1) | Σ Np(t) |
| 2 | 5 | A | 12 | 500 | *** | *** | *** | TL1 | Np(5) | |
| 3 | 2 | A | 13 | 400 | *** | *** | *** | TL1 | Np(2) | |
| 4 | 3 | A | 16 | 1000 | *** | *** | *** | TL1 | Np(3) | |
| 5 | 4 | A | 20 | 1000 | *** | *** | *** | TL1 | Np(4) | |
| ⋮ | ⋮ | A | ⋮ | ⋮ | ⋮ | ⋮ | ⋮ | TL1 | ⋮ | |
| t | | A | | | | | | TL1 | Np(t) | |
| t+1 | ⋮ | A | ⋮ | ⋮ | ⋮ | ⋮ | ⋮ | TL1 | Np(t+1) | ⋮ |
| ⋮ | ⋮ | A | ⋮ | ⋮ | ⋮ | ⋮ | ⋮ | TL1 | ⋮ | ⋮ |
| p | p | A | 26 | 1500 | ⋮ | ⋮ | ⋮ | TL1 | Np(p) | ⋮ |

PT

TOOL SELECTION DEVICE, METHOD, AND PROGRAM, AND NC PROGRAM CREATION SYSTEM

RELATED APPLICATIONS

The present application is a National Phase of International Application Number PCT/JP2019/011583 filed Mar. 19, 2019 and claims priority to Japanese Application Number 2018-064497 filed Mar. 29, 2018.

TECHNICAL FIELD

The present invention relates to tool selection device, method, and program, and an NC program creation system.

BACKGROUND ART

For example, a skin which is thin and has a contour shape (for example, a single-contour skin having a curvature in a single direction or a double-contour skin having curvatures in a plurality of directions) is used for a fuselage of an aircraft or the like. In such a skin used in an aircraft, for the purpose of weight reduction or the like, the inner surface of the skin may be subjected to machining in the thickness direction, such as machining to reduce the plate thickness (hereinafter, referred to as "plate thickness machining"). In the related art, the plate thickness machining has been performed by chemical milling machining, but in recent years, the plate thickness machining has been promoted by mechanical machining through improved machine tool capabilities. In the related art, as the mechanical machining, contour machining or engraving machining using a ball end mill or a radius end mill has been generally employed, but it is mechanical machining performed on a curved surface having a curvature, so that the machining efficiency is low and it is difficult to obtain a desired surface roughness.

In the related art, various methods have been proposed as a machining method of a three-dimensional shape and a method of creating an NC program (for example, see PTLs 1 and 2).

PTL 1 discloses a method of determining a process order of a plurality of processes based on the surface accuracy of each process, in machining of a three-dimensional shape.

PTL 2 discloses a machining method for machining a three-dimensional curved surface, by using a cutting tool selected in consideration of friction.

CITATION LIST

Patent Literature

[PTL 1] Japanese Patent No. 5890907
[PTL 2] Japanese Patent No. 5402192

SUMMARY OF INVENTION

Technical Problem

In recent years, in order to improve the efficiency of machining, a curved-surface compound die tool (for example, a barrel tool, a lens tool, or the like) having curved surfaces having different radii of curvature at a bottom portion and a side portion has been proposed.

However, in the case of having a multi-curved surface using such a curved-surface compound die tool, it is necessary for an operator to manually set machining conditions, which requires labor and time. Further, in machining a multi-curved surface, there is a problem that it is difficult to select a curved-surface compound die tool having a radius of curvature and a diameter suitable for the machining in the first place.

The present invention has been made in view of such circumstances, and the purpose of the present invention is to provide tool selection device, method, and program, and an NC program creation system, capable of easily selecting a curved-surface compound die tool that is appropriate for machining a structure having a multi-curved surface.

Solution to Problem

According to a first aspect, there is provided a tool selection device including: an analysis unit that determines a feed direction and a pick feed direction of a tool, based on the shape of a machining region including a multi-curved surface or information relating to a machining surface in the machining region, and creates parameter information in which at least a value relating to a minimum radius of curvature in the machining surface and a value relating to a maximum radius of curvature in the pick feed direction are recorded; and a selection unit that selects a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge.

According to the above configuration, a feed direction and a pick feed direction of a tool are determined based on the shape of a machining region including a multi-curved surface or information relating to a machining surface in the machining region (for example, curvature information and radius of curvature information, or the like), and parameter information in which at least information relating to the minimum radius of curvature in the machining surface and information relating to the maximum radius of curvature in the determined pick feed direction are recorded is created by the analysis unit. Then, based on the parameter information, a tool used for machining the machining region is selected by the selection unit. As described above, since the tool is selected based on the curvature information (radius of curvature information) of the machining surface, a tool having an appropriate blade shape according to the radius of curvature in the machining surface can be selected. Since the radius of curvature and the curvature have an inverse relationship, either information on the radius of curvature or the curvature may be used. For example, the information on the minimum radius of curvature may be the minimum radius of curvature or the maximum curvature.

In the tool selection device, the parameter information may further include a value relating to curvature of a corner portion of the machining region, a value relating to curvature of a fillet portion, and a value relating to a height of the fillet portion.

According to the above configuration, it is possible to select a tool in consideration of a value relating to the curvature of the corner portion of the machining region, a value relating to the curvature of the fillet portion, and a value relating to the height of the fillet portion. This makes it possible to select a more appropriate tool for the shape of the machining region.

In the tool selection device, the selection unit selects, for example, a tool that satisfies a first condition and a second condition as a tool for the machining region. Here, the first condition is that a difference between a radius of curvature of the side cutting edge and a radius of curvature of the fillet portion obtained from the parameter information is within a predetermined value. Further, the second condition is that a difference between a diameter of the bottom cutting edge and a radius of curvature of the corner portion obtained from the parameter information is within a predetermined value, and a difference between an allowable minimum radius of curvature of the tool and a minimum radius of curvature of the machining surface is within a predetermined value, and a difference between a height of the side cutting edge and a height of a position where the fillet portion is provided in the machining region is within a predetermined value.

According to the above configuration, the fillet portion can be efficiently machined by using a tool that satisfies the first condition, and the machining efficiency of the machining surface and the corner portion can also be improved by using a tool that satisfies the second condition.

In the tool selection device, the analysis unit may create a parameter table in which the parameter information about a plurality of the machining regions is described, and the selection unit may divide the parameter table into a plurality of groups, based on a radius of curvature of the fillet portion, and select one tool satisfying the first condition and the second condition for each group.

According to the above configuration, when a plurality of machining regions are provided, the plurality of machining regions are divided into a plurality of groups based on the radius of curvature of the fillet portion, and one tool is selected for each group. This makes it possible to minimize the number of tools to be used.

In the tool selection device, the parameter table may include an area of each of the machining surfaces, and the selection unit may calculate a total machining evaluation value for each group, by using the tool set for each group and the parameter table, specify a target group for which an additional tool is to be set, based on the total machining evaluation value for each group, and set an additional tool by using a plurality of pieces of the parameter information belonging to the specified group. Here, the total machining evaluation value may be a cumulative value of machining evaluation values relating to a pick feed amount when each of the machining regions belonging to each group is machined by the tool set for each group.

According to the above configuration, the total machining evaluation value is calculated for each group, and the target group for which an additional tool is to be set is specified based on the total machining evaluation value. Here, since the total machining evaluation value is a cumulative value of machining evaluation values relating to the pick feed amount when each of machining regions belonging to each group is machined by a tool set for each group, a group having a long machining time can be specified by comparing the total machining evaluation values between groups. Then, since additional tools are set for the specified target group, it is possible to improve the machining efficiency of the machining region belonging to the target group.

In the tool selection device, the selection unit may obtain a minimum radius of curvature of the machining surface and a radius of curvature of the corner portion for each of the machining regions belonging to the target group, set new threshold for selecting the additional tool, based on the variation amount of the obtained minimum radius of curvature of the machining surface and the variation amount of the obtained radius of curvature of the corner portion in each machining region, and select the additional tool by using the threshold.

According to the above configuration, the variation amount of the minimum radius of curvature of the machining surface and the variation amount of the minimum radius of curvature of the corner portion for each machining region belonging to the target group are evaluated, a new threshold is set based on the variation amount, and an additional tool is selected by using the new threshold, so that it is possible to select an additional tool in consideration of the variation amount of the minimum radius of curvature of the machining surface and the variation amount of the minimum radius of curvature of the corner portion for each of the machining regions belonging to the target group.

According to a second aspect of the present invention, there is provided an NC program creation system that includes the tool selection device according to any one of the above, and sets machining conditions when machining each of the machining regions by using a tool selected by the tool selection device.

According to the NC program creation system according to the above configuration, the machining conditions of each machining region using the tool selected in consideration of the shape, the radius of curvature, and the like of each machining region are set. This makes it possible to create an NC program that improves machining efficiency. Further, a series of operations performed manually in the related art can be automated, so that the labor of the operator can be reduced and the operation time can be shortened.

According to a third aspect of the present invention, there is provided a tool selection method including: an analysis step of determining a feed direction and a pick feed direction of a tool, based on the shape of a machining region including a multi-curved surface or curvature information relating to a machining surface in the machining region, and creating parameter information in which at least a value relating to a minimum radius of curvature in the machining surface and a value relating to a maximum radius of curvature in the pick feed direction are recorded; and a selection step of selecting a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge.

According to a fourth aspect of the present invention, there is provided a tool selection program causing a computer to execute a process of determining a feed direction and a pick feed direction of a tool, based on the shape of a machining region including a multi-curved surface or curvature information relating to a machining surface in the machining region, and creating parameter information in which at least a value relating to a minimum radius of curvature in the machining surface and a value relating to a maximum radius of curvature in the pick feed direction are recorded; and a process of selecting a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge.

Advantageous Effects of Invention

There is an effect that a curved-surface compound die tool that is appropriate for machining a structure having a multi-curved surface can be easily selected.

BRIEF DESCRIPTION OF DRAWINGS

FIG. 7 is a diagram illustrating an example of a parameter table, according to the embodiment of the present invention.

FIG. 9 is a diagram illustrating an example of a tool list, according to the embodiment of the present invention.

FIG. 10 is a diagram for explaining grouping of parameter information, according to the embodiment of the present invention.

FIG. 11 is a diagram illustrating a state in which tool information is reflected on each machining region in the parameter table illustrated in FIG. 7.

FIG. 12 is a diagram for explaining a method of determining a threshold used to set an additional tool, according to the embodiment of the present invention.

FIG. 13 is a diagram for explaining a method of determining a threshold used for setting an additional tool, according to the embodiment of the present invention.

DESCRIPTION OF EMBODIMENTS

Hereinafter, tool selection device, method, and program, and an NC program creation system according to an embodiment of the present invention will be described with reference to the drawings.

Figure 1:
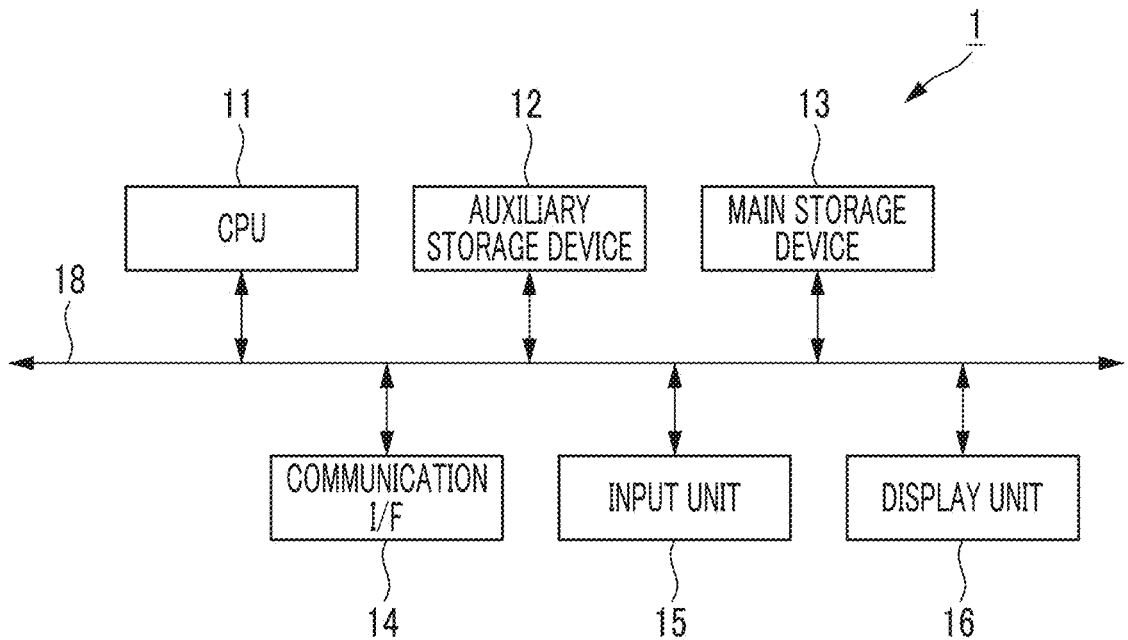
FIG. 1 is a schematic configuration diagram illustrating an example of a hardware configuration of an NC program creation system according to an embodiment of the present invention.

FIG. 1 is a schematic configuration diagram illustrating an example of a hardware configuration of a numerical control (NC) program creation system 1 according to an embodiment of the present invention. As illustrated in FIG. 1, the NC program creation system 1 is a computer system (calculator system), and includes, for example, a CPU 11, an auxiliary storage device 12 for storing programs executed by the CPU 11, data referred to by the programs, or the like, a main storage device 13 functioning as a work area when executing each program, a communication interface 14 for connecting to a network, an input unit 15 including a keyboard and a mouse, a display unit 16 including a liquid crystal display device for displaying data, or the like. These units are connected via, for example, a bus 18. Examples of the auxiliary storage device 12 include a magnetic disk, a magneto-optical disk, and a semiconductor memory.

A series of processes for realizing various functions to be described later are stored in the auxiliary storage device 12 in the form of a program as an example, and the CPU 11 reads the program into the main storage device 13 to process information and executes a calculation process, thereby realizing various functions. The program may be installed in the auxiliary storage device 12 in advance, provided in a state stored in another computer-readable storage medium, or distributed via a wired or wireless communication unit. The computer-readable storage medium is a magnetic disk, a magneto-optical disk, a CD-ROM, a DVD-ROM, a semiconductor memory, or the like.

Figure 2:
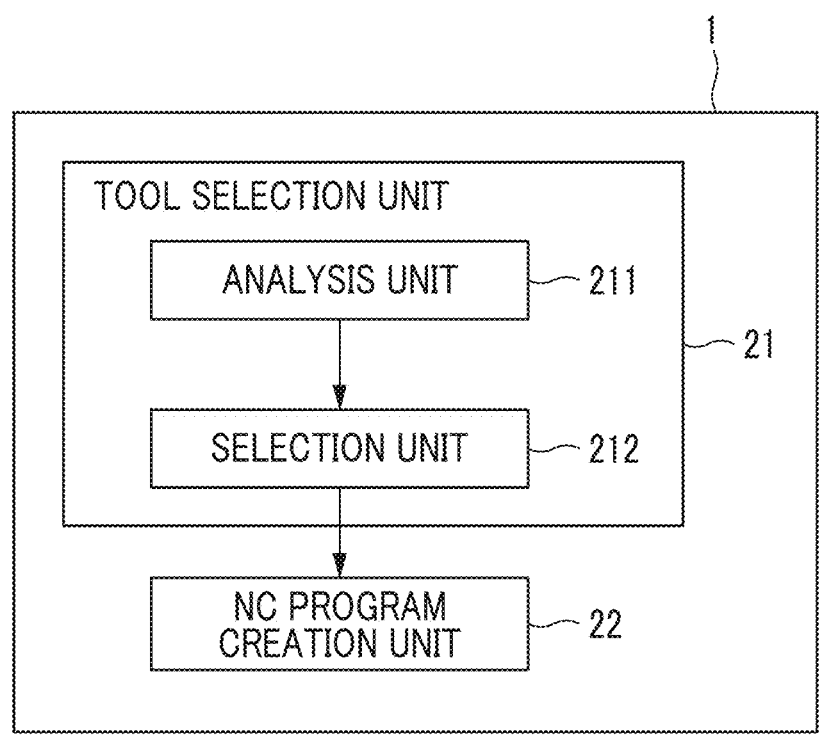
FIG. 2 is a functional block diagram illustrating an example of functions provided in the NC program creation system according to the embodiment of the present invention.

FIG. 2 is a functional block diagram illustrating an example of functions provided in the NC program creation system 1. As illustrated in FIG. 2, the NC program creation system 1 mainly includes a tool selection unit (tool selection device) 21 and an NC program creation unit 22.

The tool selection unit 21 has a function of automatically selecting a tool suitable for the machining when a structure including a multi-curved surface is formed by machining. The tool selection unit 21 includes, for example, an analysis unit 211 and a selection unit 212 as main components.

The analysis unit 211 acquires, for example, three-dimensional shape data (hereinafter, referred to as "shape data") of a structure drawn using a CAD device. The shape data is data obtained by converting a three-dimensional shape model of a structure to be subjected to machining into numerical data, and is, for example, a numerical representation of an outer shape of a three-dimensional shape model (hereinafter, referred to as a "shape model") and the surface shape enclosed by the outer shape. The shape data may be parametric data or non-parametric data. The parametric data is graphic data in which the distance, length, angle, and the like are defined not by numerical values but by variables, and is a graphic data format in which a graphic can be easily changed by exchanging variables.

In the present embodiment, the shape model includes a multi-curved surface. The analysis unit 211 creates a parameter table by analyzing the acquired shape data.

The analysis unit 211 classifies the shape model based on the shape data into a plurality of machining regions, for example, and based on the shape of each machining region or the curvature information on the machining surface of each machining region, determines the pick feed direction and the tool feed direction for each machining region. Then, for each machining region, parameter information is created in which parameters including a value relating to a minimum radius of curvature in the machining surface and a value relating to a maximum radius of curvature in the pick feed direction are recorded.

Hereinafter, the analysis process executed by the analysis unit 211 will be described more specifically. In the following description, for example, a case will be described in which a pocket portion machining (thinning machining) is performed on an aircraft skin constituting an aircraft fuselage or the like to further reduce the weight.

Figure 3:
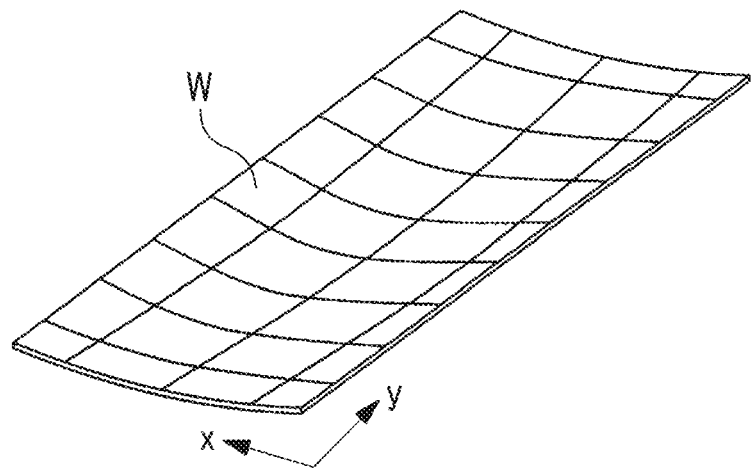
FIG. 3 is a diagram illustrating an example of a shape model in which an NC program is created by the NC program creation system according to the embodiment of the present invention.
Figure 4:
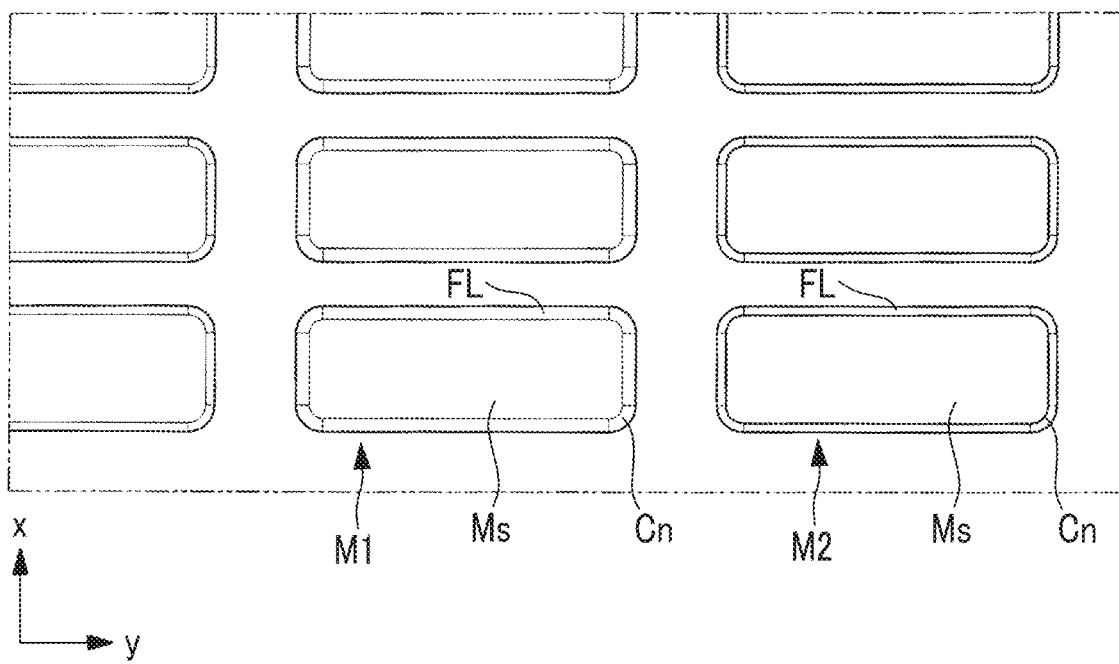
FIG. 4 is an enlarged view of the shape of a pocket when a work is projected onto a two-dimensional plane, according to the embodiment of the present invention.

FIGS. 3 and 4 are diagrams illustrating an example of a shape model as a final workpiece. FIG. 3 is a diagram schematically illustrating the shape of the work W, and FIG. 4 is an enlarged view of the shapes of the pockets M1 and M2 when the work W is projected onto a two-dimensional plane.

As illustrated in FIGS. 3 and 4, the shape model is, for example, a machined shape in which a plurality of pockets M1 and M2 arranged at predetermined intervals with respect to a work (aircraft outer panel) W having a predetermined radius of curvature. As illustrated in FIG. 4, each of the pockets M1 and M2 is a substantially rectangular machining surface Ms having four curved corner portions Cn, and a fillet portion FL is formed on the outer peripheral surface of the machining surface Ms. The fillet portion FL of the pocket M1 and the fillet portion FL of the pocket M2 have different radii of curvature.

Figure 5:
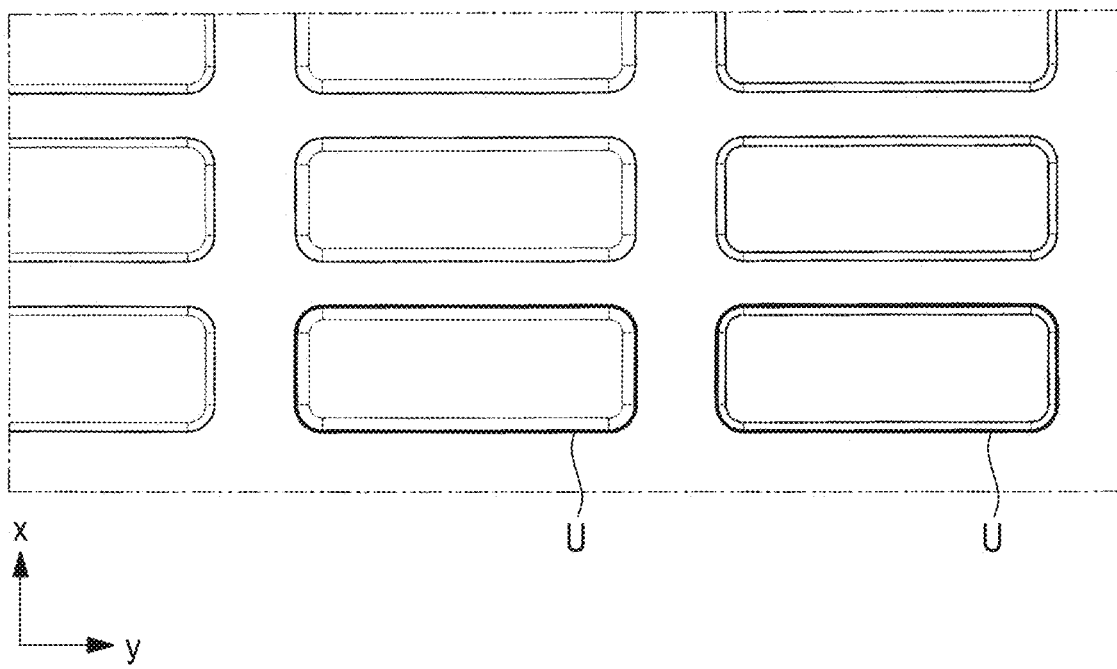
FIG. 5 is a diagram for explaining setting of a machining region, according to the embodiment of the present invention.
Figure 6:
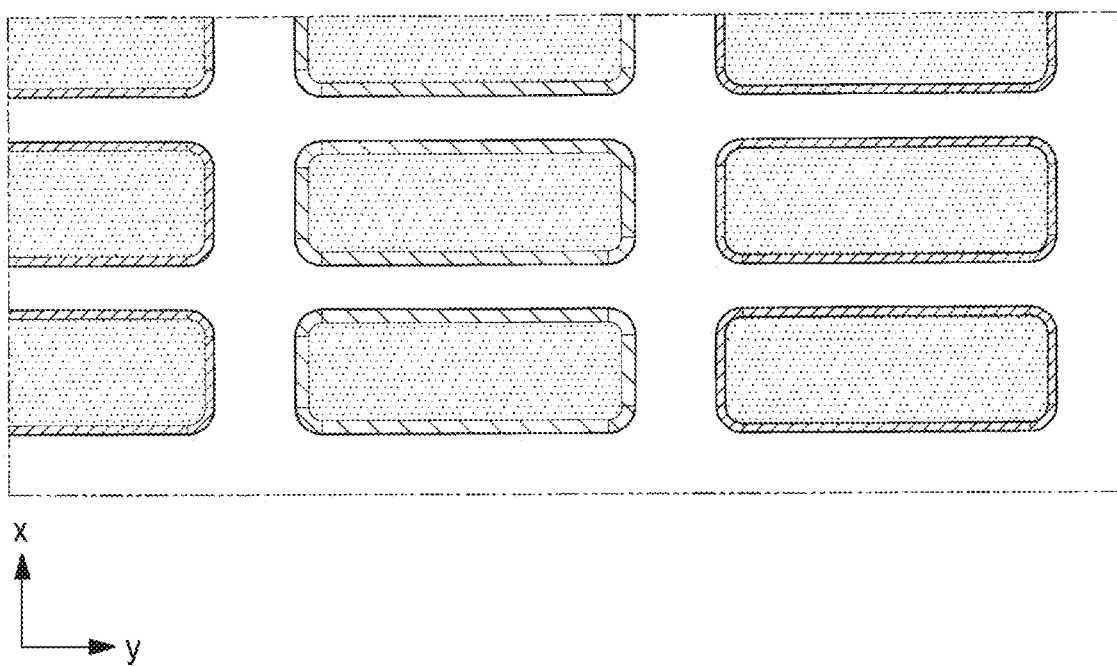
FIG. 6 is a diagram for explaining element classification and coloring according to the element classification in a machining region, according to the embodiment of the present invention.

When acquiring the shape data of the shape model, the analysis unit 211 sets each machining region U on the shape model represented by the shape data. As a result, for example, as illustrated in FIG. 5, each of the pockets M1, M2 is set as a machining region U. Subsequently, the analysis unit 211 further classifies each machining region U into various machining elements, assigns identification information to each of the classified elements, and colors the same element (for example, a machining surface, a fillet portion, a tapered portion, or the like) with the same color. Thereby, for example, as illustrated in FIG. 6, a different color is applied to each element. FIG. 6 shows an example in which the type of hatching is changed instead of the color for convenience.

Subsequently, the analysis unit 211 determines a tool feed direction and a pick feed direction, for each machining region U. For example, the tool feed direction and the pick feed direction can be determined by any of the following methods 1) to 3).

1) A circumscribed rectangle of the machining region U is created by projecting each machining region U onto a two-dimensional plane, and sets the long side and the short side as a feed direction and a pick feed direction, respectively.
2) A circumscribed rectangle of the machining region U is created by projecting each machining region U onto a two-dimensional plane, sets the long side and the short side of circumscribed rectangle, and sets a side having a larger maximum radius of curvature and a side having a smaller maximum radius of curvature as a feed direction and a pick feed direction, respectively.
3) Among the XY axis directions of the CAD model, the axis having a larger maximum radius of curvature is set as the feed direction, and the axis having a smaller maximum radius of curvature is set as the pick feed direction.

In this way, after determining the feed direction and the pick feed direction of the tool for each machining region U, subsequently, for each of the machining surfaces Ms, the analysis unit 211 acquires the maximum radius of curvature in the pick feed direction and the minimum radius of curvature in the entire machining surface Ms.

Further, the analysis unit 211 acquires, from the shape model, a value relating to the curvature of the corner portion Cn, a value relating to the curvature of the fillet portion FL, and a value relating to the height of the fillet portion FL, for each machining region U. Here, examples of the "value relating to curvature" include a curvature, a curvature radius, a diameter obtained by doubling the curvature radius, or the like. In the present embodiment, as an example, "radius of curvature" will be described as an example of "value relating to curvature". The value relating to the height of the fillet portion is a distance from the machining surface Mt to the upper surface of the fillet portion, and corresponds to the depth of the pockets M1 and M2 shown in FIG. 4.

After creating the parameter information in which the parameters of each element are registered for each machining region U, the analysis unit 211 creates a parameter table by further integrating a plurality of pieces of parameter information. FIG. 7 is a diagram illustrating an example of the parameter table PT. In the parameter table PT shown in FIG. 7, parameter information Pi in which the parameter value of each element constituting each machining region U is described for each component constituting the shape model is described. In the parameter table PT shown in FIG. 7, as elements, the cutting edge Eg to be used, the radius of curvature Fl_r of the fillet portion, the radius of curvature Cn_r of the corner portion (when the curvatures of the corner portions are different in the machining region, the minimum radius of curvature MinCn_r is recorded), the minimum radius of curvature MinCt_r of the machining surface Ms, the maximum radius of curvature MaxCt_r in the pick feed direction, the height Fl_h of the fillet portion, and the area S of the machining surface Mt are illustrated, the elements are examples, other elements may be added, and parameters not used in the selection process to be described later can be omitted as appropriate. In addition, for the cutting edge to be used, which part of the tool is used when machining each machining region U, specifically, whether the cutting edge is the bottom cutting edge or the side cutting edge is registered. The details of the tool will be described later.

When the parameter table PT for the structure is created by the analysis unit 211, the selection unit 212 selects a tool required for machining the shape model by using the parameter table PT.

Hereinafter, the tool will be described with reference to FIGS. 8A-8C. In the present embodiment, the tool used for the machining of the shape model is different from the ball end mill, and is a curved-surface compound die tool having the bottom cutting edge having a curved-surface shape and the side cutting edge having a curved-surface shape having a radius of curvature different from a radius of curvature of a curved surface of the bottom cutting edge. Here, as an example, a barrel tool, a lens tool, and a hybrid tool are given, and features relating to the shape of each tool, in the present embodiment are defined. The tool according to the present embodiment may be a chip type tool or an end mill type tool.

Figure 8A:
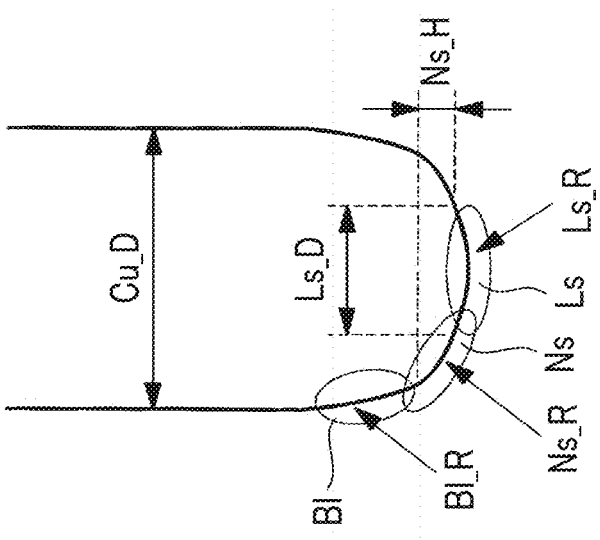
FIGS. 8A-8C are views illustrating an example of a curved-surface compound die tool, according to the embodiment of the present invention.

As illustrated in FIG. 8A, the barrel tool is a tool including a flat bottom cutting edge and a side cutting edge having two curved surfaces with different radii of curvature, in other words, curvatures. The side cutting edge provided near the bottom cutting edge is called a nose portion Ns, and the side cutting edge provided far from the bottom cutting edge is called a barrel portion Bl. Further, the radius of curvature of the curved surface of the nose portion is referred to as "nose radius Ns_R", and the height of the nose portion is referred to as "nose height Ns_H". The radius of curvature of the curved surface of the barrel portion is referred to as "barrel radius Br_R". The diameter of the tool is referred to as "tool diameter Cu_D".

Figure 8B:
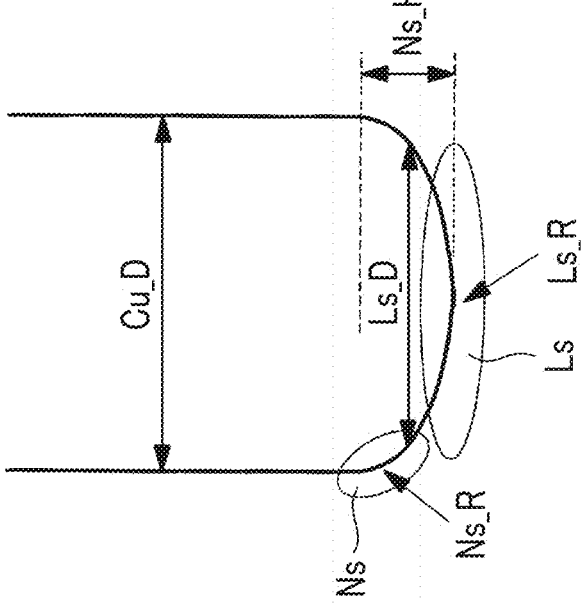
Figure 8C:
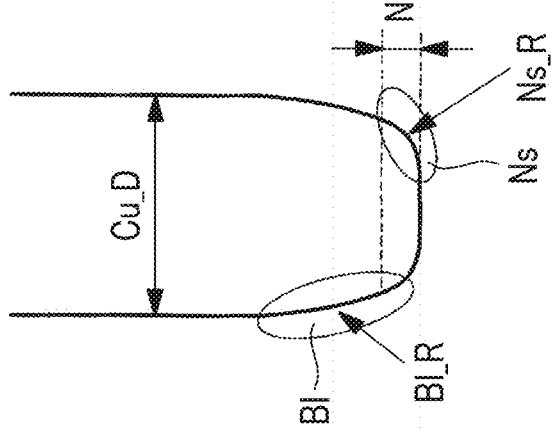

As illustrated in FIG. 8B, the lens tool is a tool having curved surfaces with different radii of curvature on the bottom cutting edge and the side cutting edge. The bottom cutting edge is referred to as a lens portion Ls, and the side cutting edge is referred to as a nose portion Ns. The radius of curvature of the lens portion Ls is referred to as "lens radius Ls_R", and the diameter of the lens portion Ls at the boundary between the lens portion Ls and the nose portion Ns is referred to as "bottom cutting edge diameter Ls_D". Further, the height of the nose portion Ns is referred to as a nose height "Ns_H". Other definitions are the same as in the above barrel tool.

The hybrid tool has a shape obtained by combining the barrel tool and the lens tool. As illustrated in FIG. 8C, the bottom cutting edge is a lens portion, and the side cutting edge is provided with a nose portion Ns and a barrel portion Bl. Since each definition is as described above, the description thereof will be omitted.

Next, the selection unit 212 of the tool selection unit 21 will be described in detail with reference to the drawings.

The selection unit 212 selects a tool suitable for machining each machining region U from among the curved-surface compound die tools such as the barrel tool, the lens tool, and the hybrid tool.

For example, when a tool list for machining a machining region has already been set, the most suitable tool is assigned from the tool list to each machining region.

For example, when the tool list has already been determined, the selection unit 212 acquires information on the tool list. In the tool list, at least the type of the tool, the nose radius Ns_R, the nose height Ns_H, the bottom cutting edge diameter Ls_D, and the minimum allowable radius of curvature MinCr of the tool are registered for each tool. Further, as other types of information, a lens radius Ls_R, a tool diameter Cu_D, and the like may be registered.

FIG. 9 shows an example of the tool list. In the tool list shown in FIG. 9, for each tool, the type of the tool, the nose radius Ns_R, the lens radius Ls_R, the nose height Ns_H, the bottom cutting edge diameter Ls_D, the tool diameter Cu_D, and the minimum allowable radius of curvature MinCr of the tool are registered. Here, the minimum allowable radius of curvature MinCr is a parameter determined according to the lens radius Ls_R, the allowable bite amount I, and the bottom cutting edge diameter Ls_D, and is a value calculated by substituting the lens radius Ls_R, the allowable bite amount I, and the bottom cutting edge diameter Ls_D into a known function. Here, the allowable bite amount I refers to the allowable amount of depth when the target machining surface is excessively cut.

Next, the selection unit 212 acquires the parameter table PT of the shape model created by the analysis unit 211, and uses the acquired parameter table PT and the tool list to select a tool for machining the machining region U for each machining region U from the tool list.

For example, from the parameter table PT shown in FIG. 7, the selection unit 212 acquires parameter information Pi corresponding to "machining region ID=1", and further extracts information on a radius of curvature Fl_r of the fillet portion, a radius of curvature Cn_r of the corner portion, the minimum radius of curvature MinCt_r of the machining surface Ms, and the height Fl_h of the fillet portion.

Subsequently, the selection unit 212 extracts a tool that satisfies the following first and second conditions, from the tool list, based on the extracted values of the respective elements.

First condition: The difference between the radius of curvature of the side cutting edge of the tool (specifically, the nose radius Ns_R) and the radius of curvature Fl_r of the fillet portion is within a predetermined value.

The second condition is to satisfy all of the following conditions (A) to (C).

(A) The diameter of the bottom cutting edge (specifically, the lens radius Ls_R) is not more than twice the radius of curvature Cn_r of the corner portion.

(B) The minimum allowable radius of curvature MinCr of the tool is equal to or smaller than the minimum radius of curvature MinCt_r on the machining surface.

(C) The height of the side cutting edge is not less than the height Fl_h of the fillet portion.

When there is one tool that satisfies the first condition and the second condition, in the tool list, the tool is selected as a tool with "machining region ID=1", the information of the selected tool is registered in association with the machining region ID=1 in the parameter table, and the parameter table PT is updated.

When there are a plurality of tools that satisfy the first condition and the second condition, a tool whose nose radius Ns_R is closest to the radius of curvature Fl_r of the fillet portion is selected as a tool of "machining region ID=1". When there are a plurality of tools that satisfy the first condition, the tool that best matches the second condition may be selected as the tool with "machining region ID=1". Then, the selection unit 212 sequentially performs the above-described process on each machining region U registered in the parameter table PT to select the tool to be used for machining for all the machining regions U. Then, a tool ID is registered for each machining region U in the parameter table PT (for example, see FIG. 11).

Next, a case where a tool list has not been determined in advance, in other words, a case where the above-described tool list is started to be created will be described.

In this case, first, the parameter table PT of the shape model is acquired, and the parameter table PT is divided into a plurality of groups based on the radius of curvature Fl_r of the fillet portion. For example, in the parameter table shown in FIG. 7, three values of A, B, and C are registered as the radius of curvature Fl_r of the fillet portion. Accordingly, as illustrated in FIG. 10, the radius of curvature Fl_r is divided into a group G1 of A, a group G2 of B, and a group G3 of C.

Subsequently, the selection unit 212 extracts the minimum value Min(Cn_r) of the radius of curvature Cn_r of the corner portion, the minimum value Min(MinCt_r) of the minimum radius of curvature MinCt_r of the machining surface Ms, and the maximum value Max(Fl_h) of the height Fl_h of the fillet portion, from the parameter information of the machining region U belonging to each of the groups G1 to G3.

That is, the selection unit 212 extracts the minimum value Min(MinCn_r) of MinCn_r, the minimum value Min(MinCt_r) of MinCt_r, and the maximum value Max(Fl_h) of Fl_h, for each group.

Subsequently, the selection unit 212 selects tools that satisfy the above first and second conditions for each of the groups G1 to G3, using Min(MinCn_r), Min(MinCt_r), and Max(Fl_h) which are extracted for each group.

For example, the selection unit 212 selects a tool in which the difference between the nose radius and the radius of curvature of the fillet portion is within a predetermined value (Ns_R≈Fl_r), the difference between the lens radius and a value twice the minimum value of the radius of curvature of the corner portion in the group is within a predetermined value (Ls_R≈Min (MinCn_r)×2), the difference between the allowable minimum radius of curvature of the tool and the minimum value of the minimum radius of curvature of the machining surface is within a predetermined value (MinCr≈Min (MinCt_r)), and the difference between the nose height and the maximum value of the height of the fillet portion is within a predetermined value (Ns_H≈Max (Fl_h)). In addition, when there is no tool that satisfies all the above conditions among the available tools, a tool having the closest characteristic is selected. Thereby, one tool is selected for one group. Information on the determined tool is registered in the parameter table. FIG. 11 shows an example of a parameter table PT in which tool information is registered.

Subsequently, the selection unit 212 calculates a machining evaluation value relating to the machining time for each group, and sets an additional tool for a group having a large machining evaluation value, in other words, for a group requiring a long machining time.

For example, in the above-described setting of the tool, the same tool is assigned to the machining region having the same radius of curvature of the fillet portion. However, even when the radius of curvature of the fillet portion is the same, if another element, for example, the minimum radius of curvature in the machining surface Ms or the radius of curvature of the corner portion is different, selecting a more appropriate tool according to the characteristics may improve the machining efficiency. For example, under the above first and second conditions, the tool is selected according to the machining region having the smallest minimum radius of curvature in the machining surface within the group, and according to the machining region having the smallest radius of curvature of the corner portion in the group. Therefore, for example, for a machining region having a value larger than these parameters, it is possible to use a tool having a large nose radius or lens radius, thereby improving machining efficiency. Therefore, in order to further improve the machining efficiency, in other words, to shorten the machining time, the selection unit 212 calculates the machining evaluation value relating to the machining time of each element for each group, and performs a process for setting an additional tool according to the variation amount of each element of each group.

First, the selection unit 212 calculates a machining evaluation value Np at that time, assuming a case where each machining region U is machined using a tool selected for each group. The machining evaluation value Np is an evaluation value relating to the pick feed amount, and is calculated, for example, as illustrated in the following Expression (1), by a function (arithmetic expression) using the area S of each machining surface and the pick feed amount Pf as parameters.

$$Np = \text{roundup}(S/Pf, 0) \quad (1)$$

Here, the pick feed amount Pf is calculated by a function using the maximum radius of curvature MaxCt_r, the scallop height H, and the lens radius Ls_R as parameters in the pick feed direction as in the following Expression (2).

$$Pf = f(\text{Max}Ct\_r, H, Ls\_R) \quad (2)$$

However, when the pick feed amount Pf exceeds a preset maximum pick feed amount MaxPf, the pick feed amount Pf is set to MaxPf.

Subsequently, the selection unit 212 accumulates the machining evaluation value Np for each machining region U for each group, and calculates the total machining evaluation value ΣNp for each group. Subsequently, a group having the largest total machining evaluation value ΣNp is selected as a target group for setting an additional tool.

In the above example, the target group for setting the additional tool is selected based on the total machining evaluation value ΣNp obtained by accumulating the machining evaluation values Np relating to the pick feed amount. In this method, there is a high possibility that a target group having a long machining time (for example, a group having a large area of the machining region U in the group) is selected. Therefore, in addition to or instead of such a cumulative value, the area average value of the machining evaluation value obtained by dividing the total machining evaluation value ΣNp of each group by the area of the machining region U belonging to the group may be used to determine a group to which a tool is added.

Instead of the above example, for example, the total distance of the paths may be calculated by computer aided manufacturing (CAM), and the group having the largest total distance may be determined as the target group.

Further, a group having the largest total number of corner portions in each group and a group having the largest total number of machining surfaces may be selected as the target groups.

Next, parameter information of each machining region U belonging to the selected target group is acquired, and a new threshold for selecting an additional tool is set in accordance with the variation amount of the radius of curvature of the corner portion and the variation amount of the minimum radius of curvature of the machining surface in the group. For example, the selection unit 212 determines a threshold for selecting an additional tool by the binarization process of the p-tile method, using parameter information of each machining region U in the target group.

As a specific method for setting a new threshold, for example, there are the following two methods.

For example, when a difference between a variation coefficient (=standard deviation/average value) of the minimum radius of curvature MinCt_r of the machining surface in the target group and a variation coefficient of the radius of curvature Cn_r of the corner portion in the target group is smaller than the preset threshold, the selection unit 212 adopts the method 1, and when the difference is the preset threshold or more, the selection unit 212 adopts the method 2.

[Method 1]

Method 1 is a method of determining a new threshold for selecting an additional tool by using both the minimum curvature MinCt_r of the machining surface and the radius of curvature Cn_r of the corner portion. Hereinafter, in order to easily explain a method of determining a new threshold, a conceptual description will be given using a specific example of a parameter table as illustrated in FIG. 12 for convenience. For example, a case where p machining regions U belonging to the target group are present will be described as an example.

First, the selection unit 212 rearranges the parameter information of each machining region U belonging to the target group in ascending order of the radius of curvature Cn_r of the corner portion. Thus, the parameter information shown in FIG. 12 is rearranged as illustrated in FIG. 13. Subsequently, the selection unit 212 accumulates the machining evaluation values Np in the machining region U in ascending order of the radius of curvature Cn_r(t) of the corner portion. Then, the radius of curvature Cn_r(t) of the corner portion when the cumulative value ΣNp of the machining evaluation value Np satisfies the following Expression (3) is determined as the first threshold.

[Expression 1]

$$\sum_{i=1}^{i} N_p(i) > \left(1 - \frac{1}{\sqrt{2}}\right) \cdot \left(\sum_{i=1}^{p} N_p(i)\right) \quad (3)$$

Figure 14:
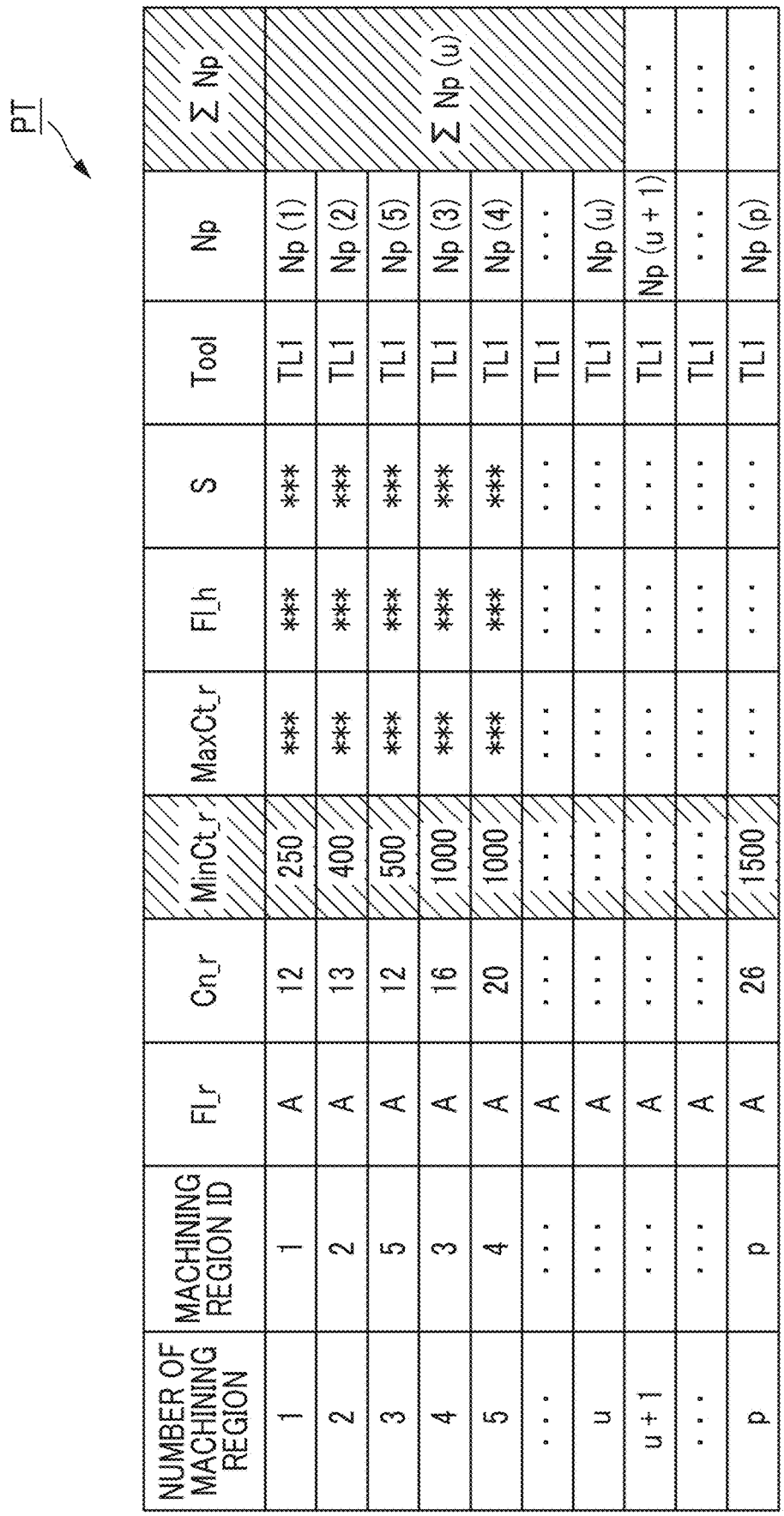
FIG. 14 is a diagram for explaining a method of determining a threshold used for setting an additional tool, according to the embodiment of the present invention.

Similarly, the selection unit 212 rearranges the parameter information of each machining region in the target group in ascending order of the minimum radius of curvature MinCt_r on the machining surface. Thus, each piece of parameter information shown in FIG. 12 is rearranged as illustrated in FIG. 14. Subsequently, the selection unit 212 accumulates the machining evaluation value Np in the machining region U in ascending order from the minimum radius of curvature MinCt_r, and determines the minimum radius of curvature MinCt_r(u) when the cumulative value ΣNp satisfies the following Expression (4) as the second threshold.

[Expression 2]

$$\sum_{i=1}^{u} N_p(i) > \left(1 - \frac{1}{\sqrt{2}}\right) \cdot \left(\sum_{i=1}^{p} N_p(i)\right) \quad (4)$$

Next, the selection unit 212 performs a process of adjusting the first threshold and the second threshold. That is, since the first threshold and the second threshold are individually determined based on the radius of curvature Cn_r of the corner portion and the minimum radius of curvature MinCt_r of the machining surface, the mutual relationship is not considered. Thus, a new threshold is adjusted using the first threshold and the second threshold.

Specifically, in the target group, the parameter information of the machining region U in which the radius of curvature Cn_r of the corner portion is equal to or greater than the first threshold Cn_r(t), and the minimum radius of curvature MinCt_r is equal to or greater than a predetermined minimum radius of curvature which is greater than the second threshold MinCt_r(u) (here, as an example, the parameter information of the machining region U in which minimum radius of curvature MinCt_r is equal to or larger than the minimum radius of curvature Ct_r(u+1) next to the second threshold MinCt_r (u)) is extracted, and the machining evaluation value Np of the extracted parameter information is accumulated. When this cumulative value is expressed as ΣNp(t, u+1) for convenience, the absolute value of the difference between the cumulative value ΣNp(t, u+1) and the value obtained by dividing the total machining evaluation value ΣNp of the target group by 2 is calculated and used as the first evaluation value X1. This can be expressed by the following Expression (5).

$$X1 = |\Sigma Np/2 - \Sigma Np(t, u+1)| \quad (5)$$

Next, the selection unit 212 extracts the parameter information of the machining region U in which the radius of curvature Cn_r of the corner portion in the target group is equal to or larger than the radius of curvature Cn_r(t+1) next to the first threshold Cn_r(t), and the minimum radius of curvature MinCt_r is equal to or larger than the second threshold MinCt_r(u), and accumulates the machining evaluation value Np of the extracted parameter information. When this cumulative value is expressed as ΣNp(t+1, u) for convenience, the absolute value of the difference between the cumulative value ΣNp(t+1, u) and the value obtained by dividing the total machining evaluation value ΣNp of the target group by 2 is used as the second evaluation value X2. This can be expressed by the following Expression (6).

$$X2 = |\Sigma Np/2 - \Sigma Np(t+1, u)| \quad (6)$$

Then, a smaller evaluation value is selected from the first evaluation value X1 and the second evaluation value X2, and the first threshold and the second threshold used for the evaluation value are determined as new thresholds for selecting additional tools. For example, when the second evaluation value X2 is smaller than the first evaluation value X1, the first threshold is changed to Cn_r(t+1). Note that the second threshold remains at Ct_r(u).

[Method 2]

Method 2 is a method of determining a new threshold for selecting an additional tool by using only the element having the larger variation coefficient, among the radius of curvature Cn_r of the corner portion and the minimum curvature MinCt_r of the machining surface.

First, the selection unit 212 calculates the variation coefficient of the radius of curvature Cn_r of the corner portion in the target group and the variation coefficient (=standard deviation/average value) of the minimum radius of curvature MinCt_r of the machining surface in the target group, and specifies an element having the larger variation coefficient. Then, the parameter information of each machining region U belonging to the target group is rearranged in ascending order of the specified element, the machining evaluation values Np in the machining region U are accumulated in ascending order, and the parameter value of the element when the cumulative value ΣNp satisfies the following Expression (7) is selected as the threshold.

[Expression 3]

$$\Sigma_{i=1}^{v} N_p(i) > \tfrac{1}{2} \cdot (\Sigma_{i=1}^{P} N_p(i)) \quad (7)$$

In this way, when the threshold Cn_r of the radius of curvature of the corner portion and the threshold of the minimum radius of curvature MinCt_r of the machining surface are determined as new thresholds for selecting an additional tool, these values are used as the minimum radius of curvature MinCt_r and the radius of curvature Cn_r of the first condition and the second condition to select an additional tool. Note that the additional tool selection is the same as the above-described tool selection, and a detailed description thereof will be omitted.

The additional selection of the tool may be performed, for example, up to a predetermined number which is set in advance, or every time a tool is added, the machining efficiency before and after the tool is added may be evaluated, and tool addition may be repeated until the machining efficiency is reduced.

In this way, when the tool used for machining the shape model is determined, a parameter table PT in which each machining region U is associated with the tool information is output to the NC program creation unit 22.

The NC program creation unit 22 sets machining conditions for each machining region U, by using the parameter information for each machining region U and the tool information selected by the tool selection unit 21. Examples of the machining conditions include the number of rotations of the tool, the feed speed, the cutting depth in the axial direction, and the like. Subsequently, the NC program creation unit creates a tool path, which is a machining path of the tool, based on the machining conditions and the parameter information of the machining region U.

Figure 15:
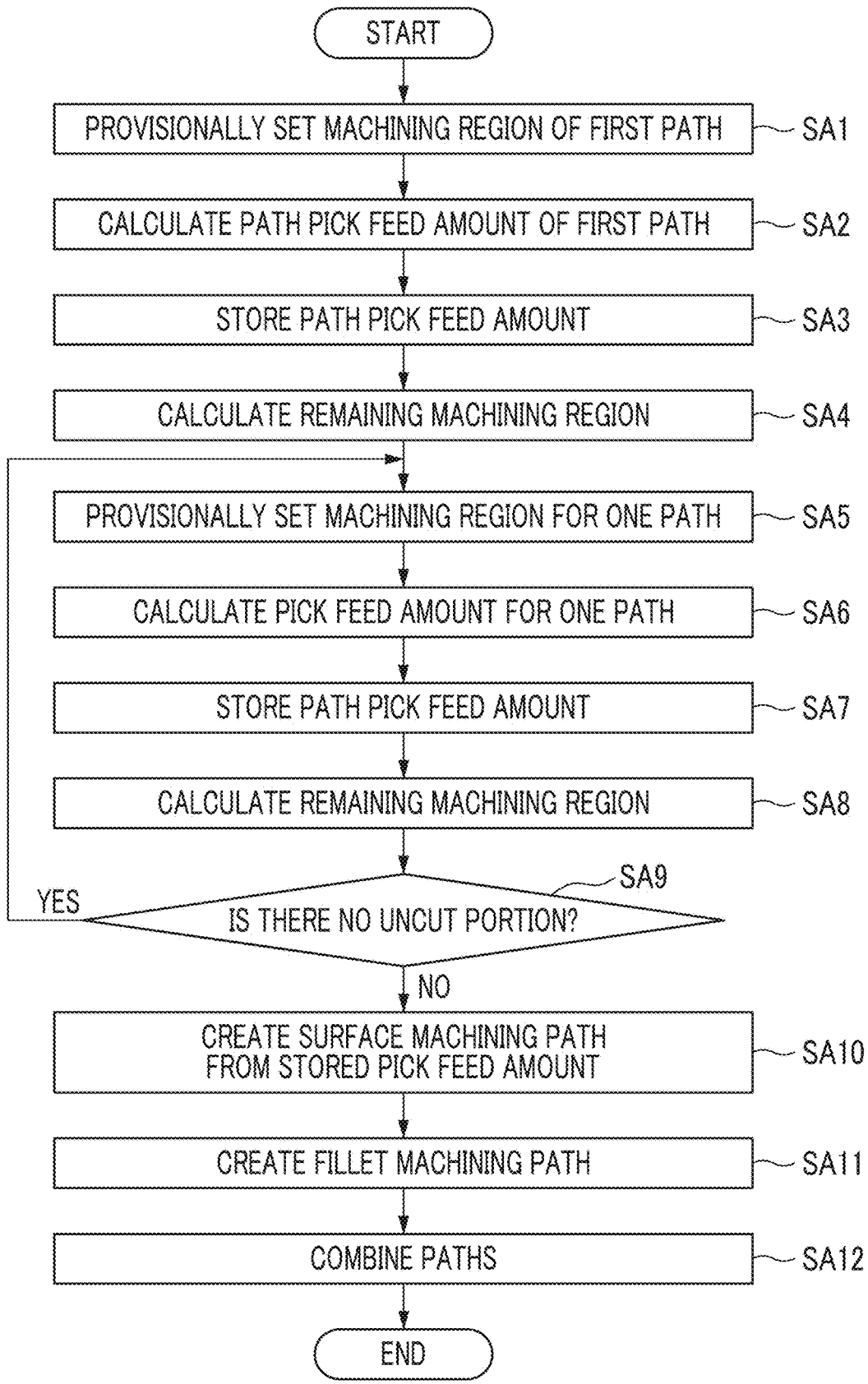
FIG. 15 is a flowchart illustrating an example of a tool path creation process executed by the NC program creation unit, according to the embodiment of the present invention.

For example, when generating the pick feed amount for each machining region U, the NC program creation unit 22 may generate the pick feed amount for each path, by using the following method. FIG. 15 is a flowchart illustrating an example of a tool path creation process executed by the NC program creation unit 22.

First, when a machining region U for which a machining condition is determined is specified, parameter information of the specified machining region U is acquired. Subsequently, the machining region of the first path in the machining region is provisionally set (SA1), and the path pick feed amount of the first path is calculated (SA2). Subsequently, the pick feed amount of the calculated path is stored (SA3), and the area of the remaining machining region is calculated (SA4). Next, the machining region for one path is provisionally set (SA5), and the pick feed amount for one path that is provisionally set is calculated (SA6). Subsequently, the calculated pick feed amount of the path is stored (SA7), and the area of the remaining machining region is calculated (SA8). Next, it is determined whether or not there is any uncut portion (SA9). If there is any uncut portion (SA9: YES), the process returns to step SA5 to perform the subsequent process. On the other hand, if there is no uncut portion (SA9: NO), a surface machining path is created from the stored pick feed amount (SA10). Subsequently, a machining path for the fillet portion is created (SA11), the created paths are combined (SA12), and the process ends.

The NC program creation unit 22 creates a tool path for the entire shape model by executing the above-described process on each machining region U. In this way, when the tool path of the entire shape model is created, the NC program creation unit 22 converts the tool path into an appropriate NC program corresponding to the NC machine tool used for machining, and outputs or stores in a predetermined storage area, the converted NC program.

Figure 16:
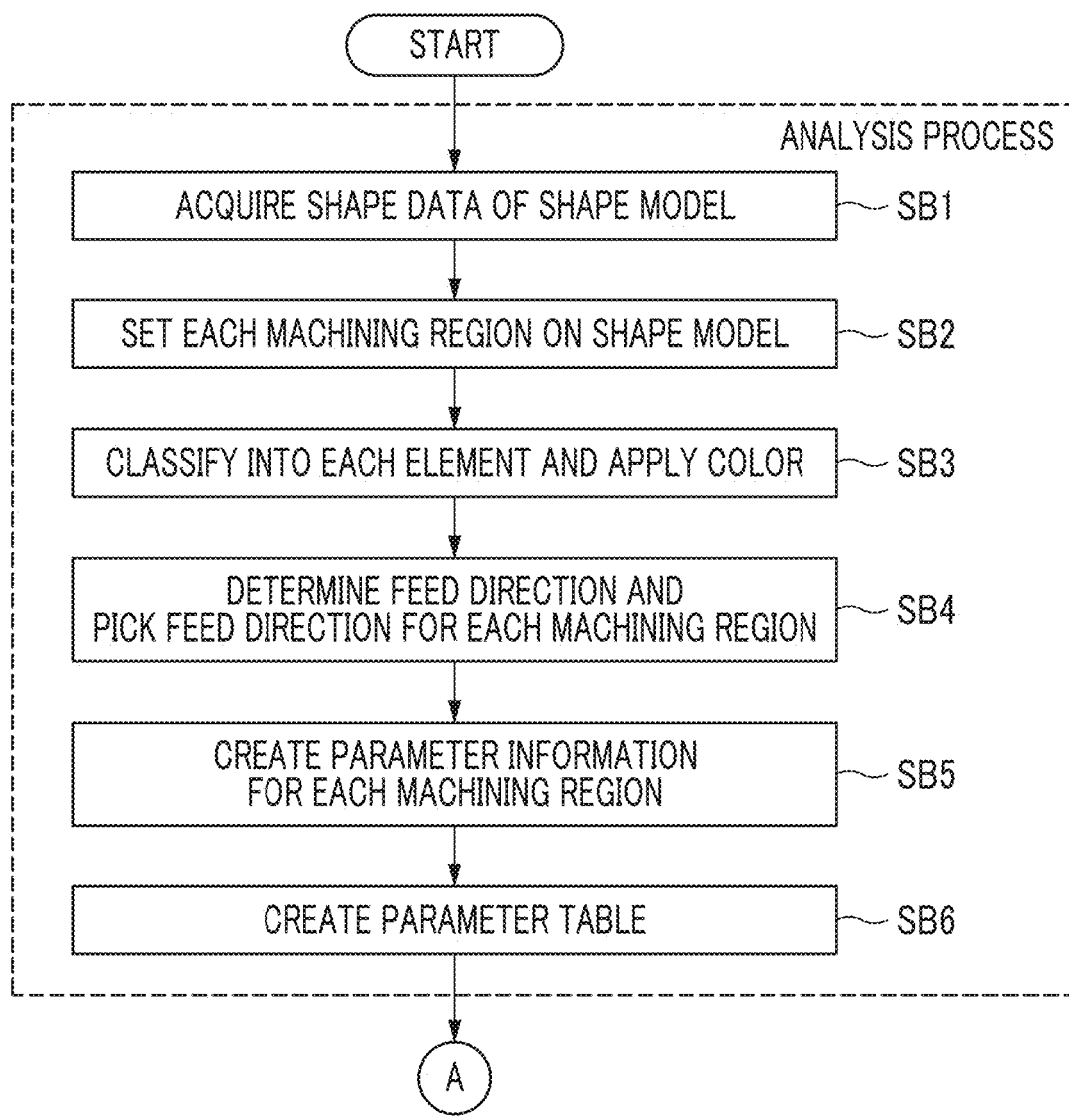
FIG. 16 is a flowchart illustrating an example of a procedure of an analysis process included in the NC program creation process executed by the NC program creation system.
Figure 17:
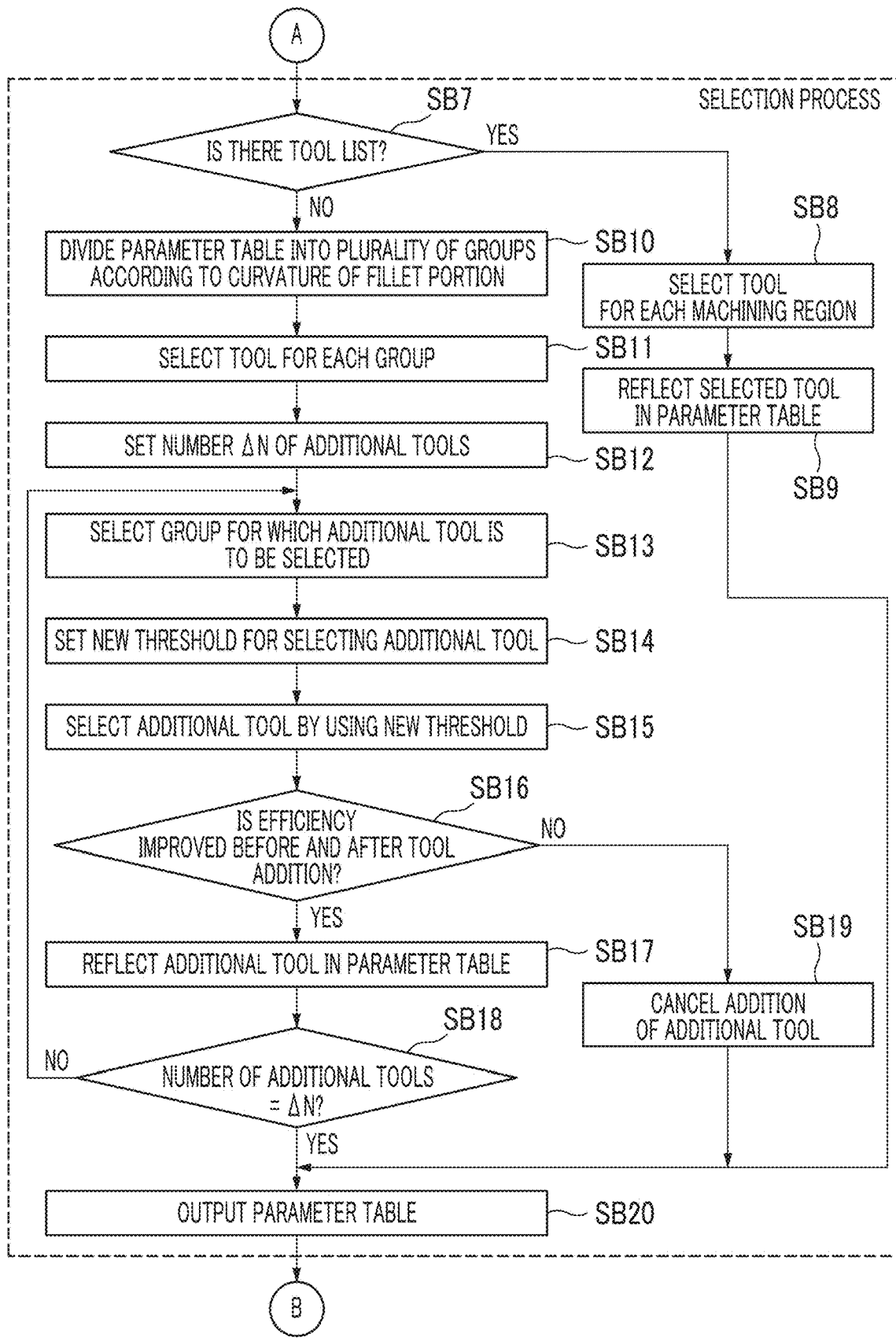
FIG. 17 is a flowchart illustrating an example of a procedure of a selection process included in the NC program creation process executed by the NC program creation system.
Figure 18:
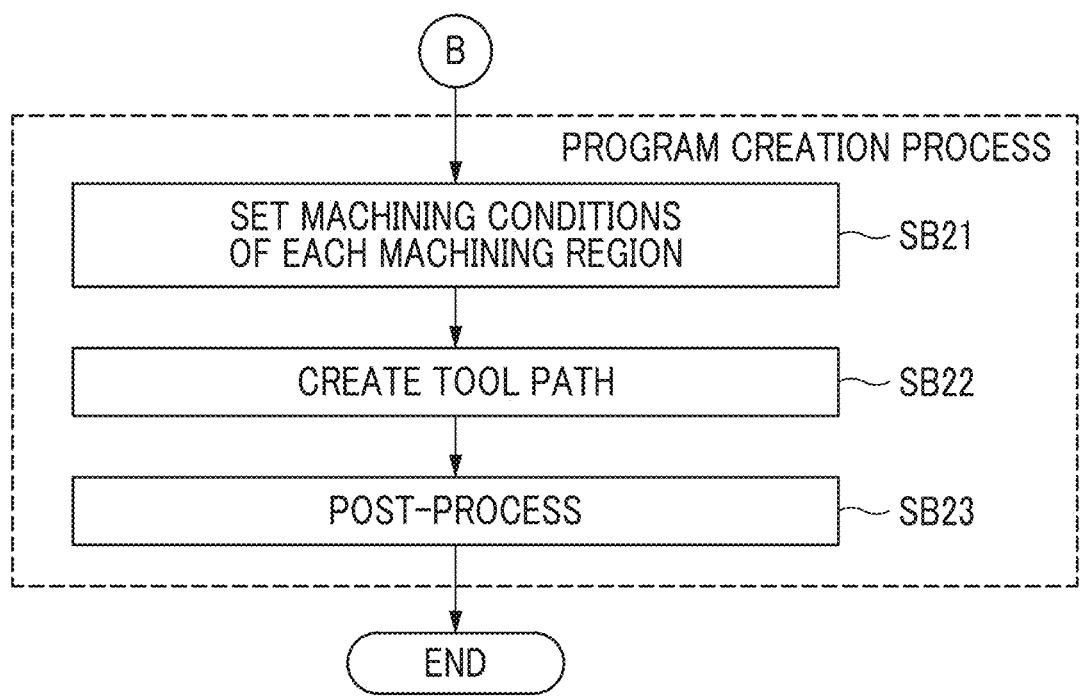
FIG. 18 is a flowchart illustrating an example of a procedure of a creation process included in the NC program creation process executed by the NC program creation system.

Next, the entire flow of the NC program creation method including the tool selection method executed by the above-described NC program creation system will be briefly described with reference to FIGS. 16 to 18. FIGS. 16 to 18 are flowcharts illustrating an example of a procedure of the NC program creation process executed by the NC program creation system 1.

First, an analysis process is performed by the analysis unit 211 of the NC program creation system 1. This analysis process is realized, for example, by the CPU 11 illustrated in FIG. 1 executing the analysis program stored in the auxiliary storage device 12.

First, when acquiring the shape data of the shape model (SB1), the analysis unit 211 sets each machining region U on the shape model represented by the shape data (SB2). Subsequently, the analysis unit 211 further classifies each machining region U into various machining elements, assigns identification information to each of the classified elements, and colors the same element (for example, a machining surface, a fillet portion, a tapered portion, or the like) with the same color (SB3).

Subsequently, the analysis unit 211 determines a tool feed direction and a pick feed direction, for each machining region U (SB4). Next, the analysis unit 211 obtains, for each machining region U, the maximum radius of curvature MaxCt_r in the pick feed direction, the minimum radius of curvature MinCt_R in the machining surface Ms, the cutting edge Eg to be used, the radius of curvature Fl_r of the fillet portion, the radius of curvature Cn_r of the corner portion, the height Fl_h of the fillet portion, and the area S of the machining surface Mt, and creates parameter information in which the obtained parameter values of various elements are associated with the machining region U (SB5), and integrates the parameter information to create a parameter table PT (see FIG. 7) in which parameter information on a plurality of machining regions U constituting the shape model is described (SB6).

In this way, when the parameter table PT is created, subsequently, the selection unit 212 performs a selection process. This selection process is realized, for example, by the CPU 11 shown in FIG. 1 executing the selection program stored in the auxiliary storage device 12.

First, the selection unit 212 determines whether or not a tool list has been created (SB7 in FIG. 17). As a result, when a tool list has been created (SB7: YES), a tool to be used for machining each machining region U is selected from the tool list, based on the parameter table PT (SB8). Specifically, for each machining region U, a tool that satisfies the above-described first and second conditions is selected as a tool to be used. Subsequently, the tool selected for each machining region U is reflected in the parameter table (SB9), and thereafter, the process proceeds to step SB20.

On the other hand, when the tool list has not been determined (SB7: NO), the parameter table PT of the shape model is divided into a plurality of groups, based on the radius of curvature Fl_r of the fillet portion (SB10). Subsequently, the selection unit 212 selects a tool for each group with reference to the parameter information of each machining region U belonging to each group (SB11). Subsequently, the selection unit 212 provisionally sets the number ΔN of additional tools (SB12), calculates the total machining evaluation value ΣNp of each group, and selects the group having the highest total machining evaluation value ΣNp as a target group for performing additional tools (SB13).

Next, the selection unit 212 acquires parameter information of each machining region U belonging to the selected target group, and sets a new threshold for selecting an additional tool in accordance with the variation amount of the radius of curvature of the corner portion in the group and the variation amount of the minimum radius of curvature of the machining surface in the group (SB14).

Next, an additional tool is selected based on the new threshold (SB15), and the machining efficiency before and after adding the additional tool is evaluated (SB16). As a result, when the machining efficiency is higher after the tool addition than before the tool addition (SB16: YES), the information on the additional tool is reflected in the parameter table (SB17). Subsequently, it is determined whether or not the number of additional tools has reached the number ΔN of additional tools provisionally determined in step SB12 (SB18). As a result, when the number of additional tools has not reached ΔN (SB18: NO), the process returns to step SB13 and repeats the above process. On the other hand, when the number of additional tools has reached ΔN in step SB18 (SB18: YES), the process proceeds to step SB20.

Further, in step SB16, when the machining efficiency is lower after the tool addition than before the tool addition (SB16: NO), the addition of the additional tool is canceled (SB19), and the process proceeds to step SB20.

In step SB20, a parameter table in which the tool information is reflected is output (SB20).

Subsequently, an NC program creation process by the NC program creation unit 22 is performed. The NC program creation process is realized by the above-described CPU 11 executing the NC program creation program stored in the auxiliary storage device 12.

The NC program creation unit 22 sets the machining conditions in each machining region U, using the parameter table PT in which each machining region U and information on a tool that machines each machining region U are associated (SB21 in FIG. 18), and creates a tool path of the tool, based on the set machining conditions and the parameter information of the machining region U (SB22).

Then, by performing a post-process, the tool path is converted into an appropriate NC program corresponding to the NC machine tool used for machining (SB23), and the converted NC program is stored in a predetermined storage area or output to the NC machine tool, and the process ends.

As described above, according to the tool selection device, method, and program, and the NC program creation system 1 according to the present embodiment, the feed direction and the pick feed direction of a tool are determined based on the shape of a machining region or the curvature information of the machining surface, and parameter information in which at least the minimum radius of curvature in the machining surface and the maximum radius of curvature in the determined pick feed direction are recorded is created by the analysis unit 211. Then, based on the parameter information, a tool used for machining the machining region is selected by the selection unit 212. As described above, since the tool is selected based on the curvature information of the machining surface, a tool having an appropriate blade shape according to the bending in the machining surface can be selected.

In the present embodiment, the case where one computer system executes the analysis program, the selection program, and the NC program creation program has been described as an example, but aspects of the present invention are not limited to this example. For example, the above three programs may be divided and stored in auxiliary storage devices provided in a plurality of computer systems, and the NC program creation system may be constructed by a plurality of computers. For example, the function of the above-described analysis unit 211 may be realized in a computer aided design (CAD) system, by storing an analysis program in the auxiliary storage device of the CAD system, and the functions of the selection unit 212 and the NC program creation unit 22 may be realized by a computer aided manufacturing (CAM) system by further storing the tool selection program and the NC program creation program in the auxiliary storage device of the CAM system.

Further, there is no CAM equipped with various functions realized by the NC program creation unit 22 according to the present embodiment, and by providing such a CAM, it is possible to automatically generate a tool path capable of improving the machining efficiency of a multi-curved surface.

Although the present invention has been described using the embodiment, the technical scope of the present invention is not limited to the scope described in the above exemplary embodiment. Various modifications or improvements can be added to the embodiment within the scope without departing from the gist of the present invention, and modified or improved aspects are also included in the technical scope of the present invention. Further, the above embodiment may be appropriately combined.

Further, the flow of the NC program creation process (analysis process, selection process, creation process) described in each of the above exemplary embodiment is also an example, and unnecessary steps may be deleted, new steps may be added, or processing order may be changed within a scope not deviating from the gist of the present invention.

The invention claimed is:

1. A tool selection device comprising:
an analysis unit that determines a feed direction and a pick feed direction of a tool, based on the shape of a machining region including a multi-curved surface or information relating to a machining surface in the machining region, and creates parameter information in which at least a value relating to a minimum radius of curvature in the machining surface and a value relating to a maximum radius of curvature in the pick feed direction are recorded; and
a selection unit that selects a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge;
wherein in the parameter information, a value relating to a curvature of a corner portion of the machining region, a value relating to a curvature of a fillet portion, and a value relating to a height of the fillet portion are further recorded.

2. The tool selection device according to claim 1, wherein the selection unit selects a tool that satisfies a first condition and a second condition as a tool for the machining region,
wherein the first condition is that a difference between a radius of curvature of the side cutting edge and a radius of curvature of the fillet portion obtained from the parameter information is within a predetermined value, and
wherein the second condition is that a difference between a diameter of the bottom cutting edge and a radius of curvature of the corner portion obtained from the parameter information is within a predetermined value, a difference between an allowable minimum radius of curvature of the tool and a minimum radius of curvature of the machining surface is within a predetermined value, and a difference between a height of the side cutting edge and a height of a position where the fillet portion is provided in the machining region is within a predetermined value.

3. The tool selection device according to claim 2, wherein the analysis unit creates a parameter table in which the parameter information about a plurality of the machining regions is described, and
wherein the selection unit divides the parameter table into a plurality of groups, based on the radius of curvature of the fillet portion, and selects one tool satisfying the first condition and the second condition for each group.

4. The tool selection device according to claim 3, wherein the parameter table includes an area of each of the machining surfaces,
wherein the selection unit
calculates a total machining evaluation value for each group, by using the tool set for each group and the parameter table,
specifies a target group for which an additional tool is to be set, based on the total machining evaluation value for each group, and
sets an additional tool by using a plurality of pieces of the parameter information belonging to the specified group, and
wherein the total machining evaluation value is a cumulative value of machining evaluation values relating to a pick feed amount when each of the machining regions belonging to each group is machined by the tool set for each group.

5. The tool selection device according to claim 4,
wherein the selection unit acquires a minimum radius of curvature of the machining surface and a radius of curvature of the corner portion for each of the machining regions belonging to the target group, sets a new threshold for selecting the additional tool, based on a variation amount of the acquired minimum radius of curvature of the machining surface and a variation amount of the acquired radius of curvature of the corner portion in each machining region, and selects the additional tool by using the threshold.

6. An NC program creation system comprising:
the tool selection device according to claim 1,
wherein the NC program creation system sets machining conditions when machining each of the machining regions, by using a tool selected by the tool selection device.

7. A tool selection method comprising:
an analysis step of determining a feed direction and a pick feed direction of a tool, based on the shape of a machining region including a multi-curved surface or information relating to a machining surface in the machining region, and creating parameter information in which at least a value relating to a minimum radius of curvature in the machining surface and a value relating to a maximum radius of curvature in the pick feed direction are recorded; and
a selection step of selecting a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge;
wherein in the parameter information, a value relating to a curvature of a corner portion of the machining region, a value relating to a curvature of a fillet portion, and a value relating to a height of the fillet portion are further recorded.

8. A tool selection program causing a computer to execute:
a process of determining a feed direction and a pick feed direction of a tool, based on the shape of a machining region including a multi-curved surface or information relating to a machining surface in the machining region, and creating parameter information in which at least a value relating to a minimum radius of curvature in the machining surface and a value relating to a maximum radius of curvature in the pick feed direction are recorded; and
a process of selecting a tool to use for machining the machining region, based on the parameter information, from among a plurality of tools having a bottom cutting edge formed in a curved-surface shape and a side cutting edge formed in a curved-surface shape having a radius of curvature different from a radius of curvature of a curved surface of the bottom cutting edge;
wherein in the parameter information, a value relating to a curvature of a corner portion of the machining region, a value relating to a curvature of a fillet portion, and a value relating to a height of the fillet portion are further recorded.

\* \* \* \* \*